United States Patent [19]

Conklin, Jr.

[11] Patent Number: 5,280,831
[45] Date of Patent: Jan. 25, 1994

[54] INFORMATION PANELS FOR USE ON CONVEYOR SYSTEMS AND METHOD OF USE

[76] Inventor: Dennis R. Conklin, Jr., 2700 N. Hayden #1108, Scottsdale, Ariz. 85257

[21] Appl. No.: 996,707

[22] Filed: Dec. 24, 1992

[51] Int. Cl.⁵ ............................................. B65G 43/00
[52] U.S. Cl. ...................................... 198/502.1; 40/472
[58] Field of Search ........................ 198/502.1, 502.3; 40/472, 524

[56] References Cited

U.S. PATENT DOCUMENTS

| | | | |
|---|---|---|---|
| 1,812,715 | 6/1931 | Quillin et al. | 40/472 |
| 3,612,244 | 10/1971 | Raub, Sr. et al. | 198/579 |
| 3,849,918 | 11/1974 | Mazzocco, Sr. | 40/524 X |
| 3,900,647 | 8/1975 | Scardilli et al. | 40/472 X |
| 4,827,644 | 5/1989 | Trame | 40/524 X |
| 4,979,591 | 12/1990 | Habegger et al. | 198/502.1 X |
| 5,165,526 | 11/1992 | Conklin, Jr. | 198/804 |

FOREIGN PATENT DOCUMENTS 89560004.7 12/1989 European Pat. Off. .
2660785  4/1990 France .

*Primary Examiner*—James R. Bidwell
*Attorney, Agent, or Firm*—Don J. Flickinger; Jordan M. Meschkow; Robert A. Parsons

[57] ABSTRACT

A base plate having a top surface, wear blocks attached to at least two sides of the top surface defining a recess, and attachment member for attaching the base plate to an endless conveyor. A graphic cover plate containing indicia, aligned within the recess, and removably affixed to the top surface of the base plate.

22 Claims, 4 Drawing Sheets

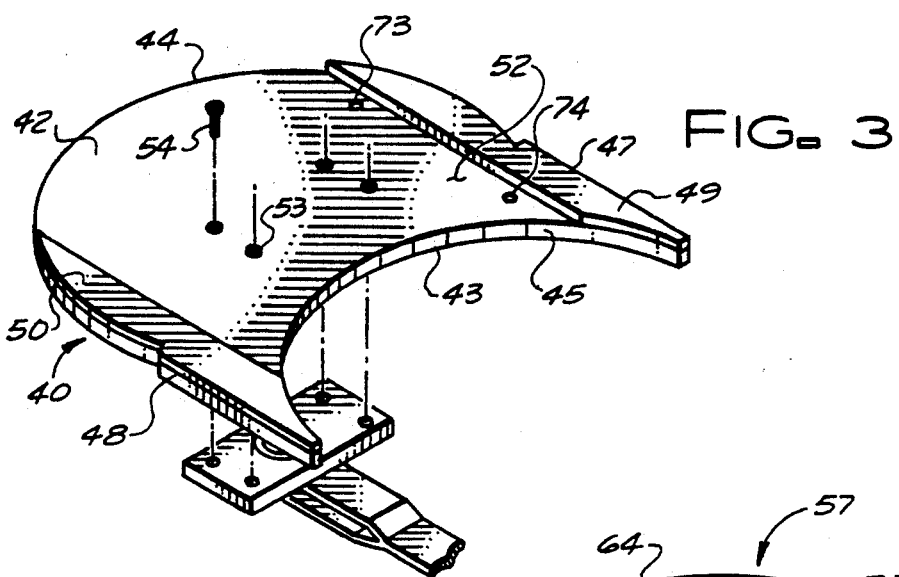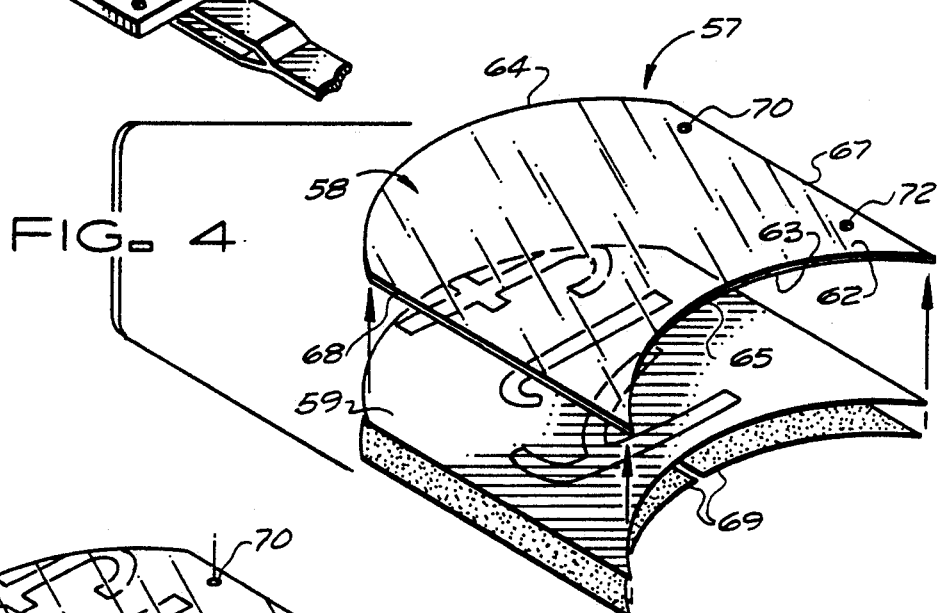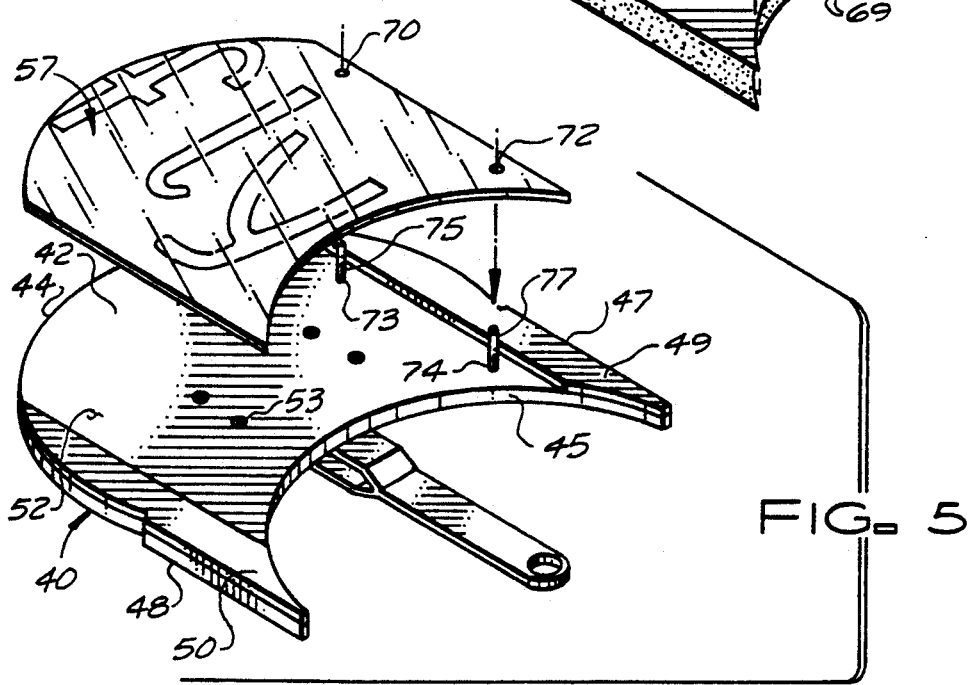

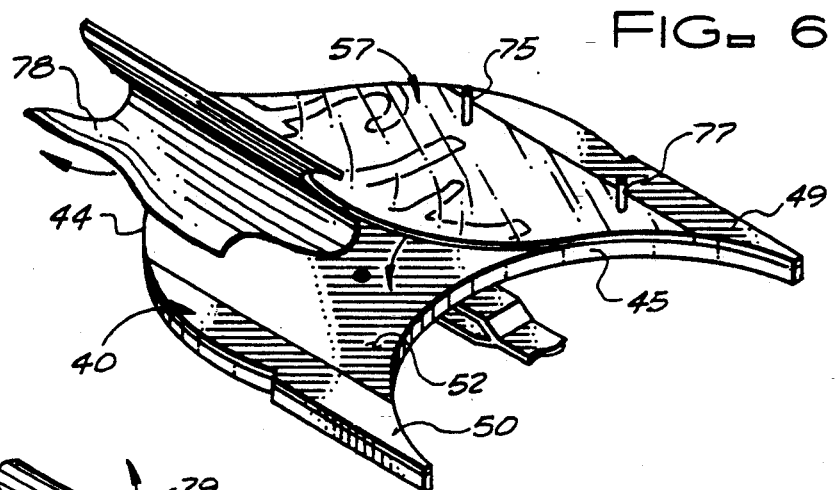
FIG. 6
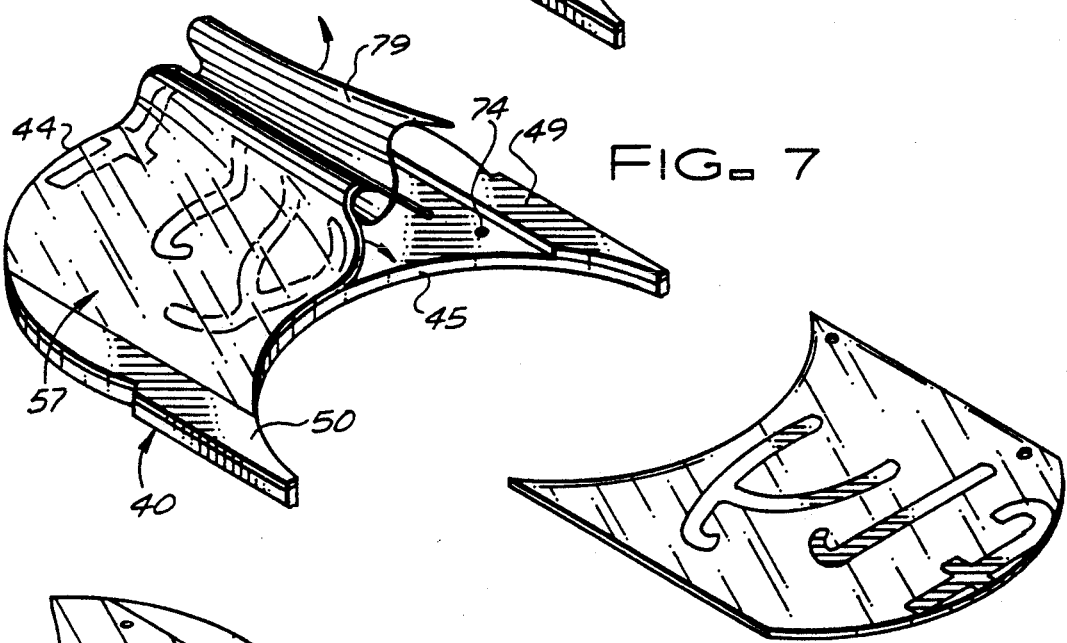
FIG. 7
FIG. 10
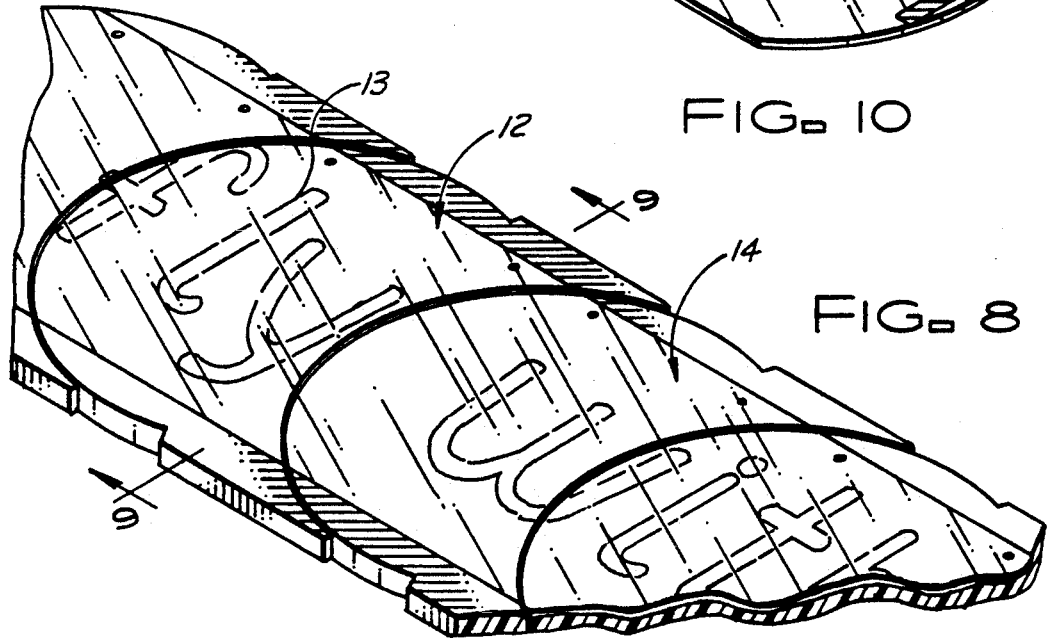
FIG. 8

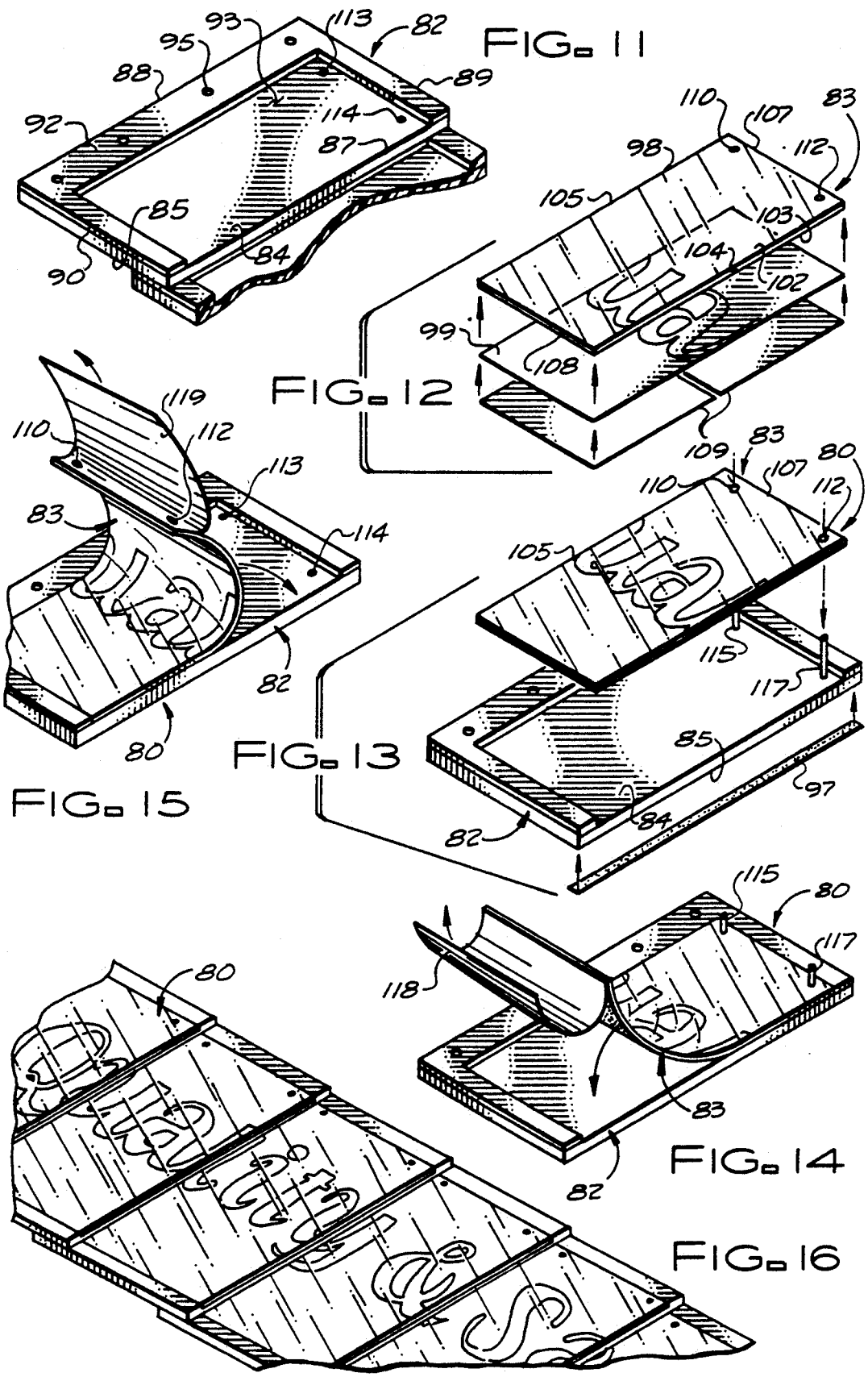

INFORMATION PANELS FOR USE ON CONVEYOR SYSTEMS AND METHOD OF USE

BACKGROUND OF THE INVENTION

1. Field of the Invention

This invention relates to apparatus for carrying visual information. More particularly, the present invention relates to advertising on conveyor systems.

In a further and more specific aspect, the instant invention relates to panels having replaceable visual information thereon for use on conveyor systems such as baggage carousels.

2. Prior Art

Conveyors for carrying items from one location to another location are well-known in the art. Conveyors are often configured as endless, essentially circular dispensing apparatus for carrying baggage at airports. These endless conveyors are often called carousels because the baggage is placed onto panels of the conveyor from a centrally located distributing point making the baggage available to the passengers around the periphery of the apparatus.

There are two general types of conveyor apparatus, those using rectangular panels and those using crescent panels. Conveyors using rectangular panels are generally oval in shape with the rectangular panels overlapping and sloping downward towards the periphery. The crescent panels are generally used on flat conveyors with an oval configuration or a serpentine configuration.

Advertisements are often placed on the center non-moving section of the carousel to display the benefits of staying in the local area around the airport or to advertise the different airlines. The advertising area is extremely limited since the people to whom the advertising is directed generally locate into one specific position around the carousel to retrieve their baggage and thereby only see a small section of the total advertising that could be placed on the nonrotating section of the carousel.

Recently, a new apparatus has been developed which consists of transparent plates replacing the steel plates of the carousel. A thin layer containing visual indicia is affixed to the undersurface of the transparent plate, which is then affixed to the carousel. A plurality of the adjacent plates form an advertisement. Advertising plates of this nature allow advertising on a space which in the past has been unused. Furthermore, it allows advertising to a large stationary crowd of people. While these plates have very good wear characteristics, in order for the plates to be exchanged, the entire plate must be removed from the carousel and exchanged for a new plate containing the new indicia. This can be somewhat time consuming and expensive. Furthermore, affixing the thin material containing the indicia to the undersurface of the plate so that it is aligned with the indicia of adjacent plates can provide some difficulties.

Others have attempted to advertise on carousel plates by affixing stickers to the top surface of the panels. While this is relatively inexpensive, it is very difficult to align the stickers, and more importantly, stickers have been shown to have very poor durability. Baggage carried on the carousel tends to scratch and catch on the sticker, with the result of the sticker being peeled off the panel. After a very short time the stickers will have corners and edges peeled off, giving a generally shabby appearance.

It would be highly advantageous, therefore, to remedy the foregoing and other deficiencies inherent in the prior art.

Accordingly, it is an object of the present invention to provide a conveyor having an improved means for displaying visual information.

Another object of the present invention is to provide a new and improved method for installing visual information on a conveyor.

Another object of the present invention is to provide information panels for use on a baggage carousel in which the indicia can be easily and quickly exchanged.

And another object of the present invention is to provide an information panel which has aligning features.

Yet another object of the present invention is to provide an information panel which has good durability and wear characteristics.

Still another object of the present invention is to provide a method of installing and aligning indicia on a base plate.

Yet still another object of the present invention is to provide an information panel capable of containing indicia carried by many different media, such as ink or photographs.

SUMMARY OF THE INVENTION

Briefly, to achieve the desired objects of the instant invention in accordance with a preferred embodiment thereof, provided is a base plate configured similar to the conventional support plate it will replace. The base plate has a pair of wear blocks extending from a top surface thereof proximate opposing sides, which define a recess. Attachment means attach the base plate to an endless conveyor system. A graphic cover plate, containing indicia, is received within the recess, aligned by alignment means and removably affixed to the top surface of the base plate by an adhesive.

The above objects are further realized in a method of installing the information panel on a carousel and a method of installing the graphic cover plate on the base plate.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 3 is a perspective view of a base plate, installed on an attachment member;

FIG. 4 is an exploded perspective view of the graphic cover plate;

FIGS. 5–7 are perspective views illustrating the alignment and affixing of the graphic cover plate to the base plate;

FIG. 8 is a perspective view illustrating a plurality of information panels containing indicia positioned to form complete visual units;

FIG. 10 is a perspective view illustrating an alternate graphic cover plate;

FIG. 11 is a perspective view illustrating an embodiment of a base plate;

FIG. 12 is an exploded perspective view illustrating an embodiment of the graphic cover plate;

FIGS. 13-15 illustrate the steps in installing the graphic cover plate of FIG. 12 onto the base plate of FIG. 11; and FIG. 16 is a perspective view illustrating completed information panels of an alternate embodiment, in the position they would appear in installed on a baggage carousel, forming complete visual units.

DETAILED DESCRIPTION OF THE PREFERRED EMBODIMENT

Figure 1:
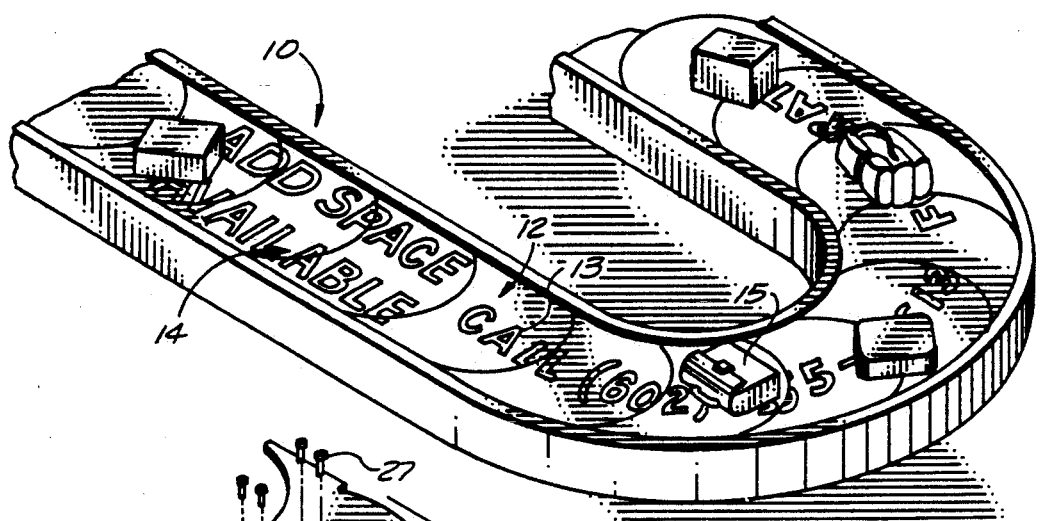
FIG. 1 is a perspective view of a baggage carousel with information panels installed.

Turning now to the drawings in which like reference characters indicate corresponding elements throughout the several views, attention is first directed to FIG. 1 which illustrates a baggage carousel generally designated 10. While the present invention may be used with endless conveyors in general, it is especially useful for improving baggage carousels well known in airports. Baggage carousel 10 is illustrated as a flat type carousel having crescent shaped information panels 12. While a flat type carousel is illustrated, it will be understood that the present invention is intended to be used on substantially any baggage carousel employing panels. Information panels 12 provide the media upon which information is provided to the public. Each information panel 12 contains indicia 13. A plurality of adjacent information panels 12, each containing indicia 13, combine to form a complete visual unit or ad 14. The platform created by information panels 12 rotate about the continuous circuit of carousel 10, carrying baggage 15 to waiting crowds, which may view the passing information as they wait for their baggage.

Figure 2:
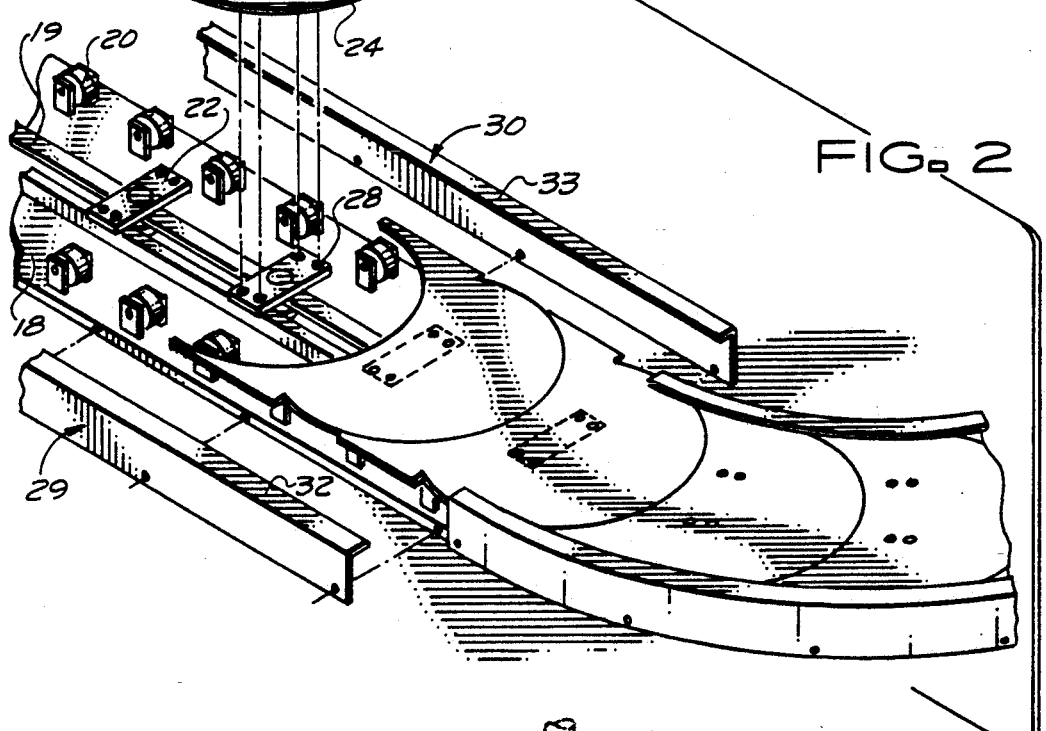
FIG. 2 is an exploded perspective view of a conventional flat, crescent plate carousel.

Referring now to FIG. 2, baggage carousel 10 is illustrated carrying conventional support plates 17. Carousel 10 includes a base 18 supporting a track 19 which extends in a continuous circuit. A plurality of rollers 20 extend from base 18 on both sides of track 19, around the continuous circuit of track 19. Track 19 contains drive means (not shown), such as a continuous chain or a plurality of link members which are circulated through track 19. Attachment members 22 are attached to the drive means, supported by track 19 in a spaced apart relationship to one another. Conventional support plates 17, each having a convex edge 23 and an opposing concave edge 24, which give them a crescent shape, are each attached to a separate attachment member 22, by attachment means. The attached conventional support plates 17 form a continuous platform, with each convex edge 23 of conventional support plates 17 nesting against a concave edge 24 of an adjacent conventional support plate 17, continuously around carousel 10. Baggage 15 is carried upon the continuous platform thus created. The sides of conventional support plates 17 ride upon and are supported by rollers 20. Attachment means consist of bores 25 formed through a medial portion of conventional support plates 17, through which bolts 27 extend, to be received within corresponding bores 28 formed in attachment members 22.

Still referring to FIG. 2, rails 29 and 30 are attached to opposing edges of base 18, covering rollers 20, and partially overlapping conventional support plates 17. Conventional support plates 17 slide under overlapping trim portions 32 and 33 of rails 29 and 30 respectively. Overlapping trim portions 32 and 33 prevent items from dropping within carousel 10 and, since they are raised above the level of conventional support plates 17, also prevent items from falling off the platform created by plates conventional support 17.

Set forth for purposes of orientation and reference in connection with the ensuing detailed description of the preferred embodiment of the instant invention, the foregoing brief description of a carousel 10 is intended to be generally representative of typical, commercially available carousels. Details not specifically illustrated and described will be readily understood and appreciated by those skilled in the art.

Referring now to FIGS. 3, base plate 40 is illustrated. Base plate 40 is preferably made of a plastic laminate such as Westinghouse Micarta, however, it will be understood that other materials may be used, such as steel. In some instances, conventional plate 17 may be used as base plate 40, with modifications made thereto as discussed for base plate 40. Base plate 40 has a top surface 42, a bottom surface 43, a convex edge 44, an opposing concave edge 45, and opposing sides 47 and 48 extending between convex edge 44 and concave edge 45. Base plate 40 is configured to replace conventional plates on conveyors, and specifically, in this embodiment, to replace conventional support plates 17 on carousel 10. To achieve this end, base plate 40 is shaped similar to conventional support plate 17 and having a thickness of ¼ inch or 3/16 inch depending upon the conventional support plate used in the carousel.

Wear blocks 49 and 50 are affixed to sides 47 and 48 respectively, and extend from convex edge 44 to concave edge 45. They protect base plate 40 from any rubbing by trim 32 and 33 as base plate 40 revolves in carousel 10 and also define a recess 52 therebetween, extending between convex edge 44 and concave edge 45. Wear blocks 49 and 50 are preferable formed from high density polyethylene, affixed to base plate 40 by way of high-bond double sided tape or other adhesive. Those skilled in the art will understand that while wear blocks 49 and 50 are preferably independent elements affixed to base plate 40, they may be formed integrally with base 40 and of the same material.

Base plate 40 is configured in a shape similar to the conventional plate it is replacing, and utilizes the carousels standard attachment members and attachment means. No modification need be made to the carousel receiving replacements of base plate 40. In FIG. 3, base plate 40 is illustrated being attached to attachment member 22 of carousel 10 illustrated in FIG. 2. Attachment means consist of bores 53 formed through a medial portion of base plate 40, through which bolts 54 extend, to be received within corresponding bores 28 formed in attachment members 22. Bolts 54 are counter sunk in bores 53 so they are flush with top surface 42 of base plate 40.

Referring now to FIG. 4, a graphic cover plate generally designated 57 is illustrated. Graphic cover plate 57 consists of a transparent sheet 58 and a thin layer 59 forming indicia 13. Transparent sheet 58 has a top surface 62, a bottom surface 63, a convex edge 64, an opposing concave edge 65 and opposing sides 67 and 68 extending between convex edge 64 and concave edge 65. Transparent sheet 58 is configured to be received by recess 52, and is preferably formed from a general purpose commercial grade polycarbonate such as Lexan.

Thin layer 59 is preferably a laminate of photographic print medium, such as duraflex, affixed to bottom surface 63 of transparent plate 58 by a thin clear pressure sensitive photographic mounting film such as permatrans. Thin layer 59 is shaped identical to transparent plate 58 and affixed to bottom surface 63 thereof. It should be understood that thin layer 59 may be of various other materials and constructions such as a thin sheet of material which is printed upon, or a thin layer of ink affixed to the bottom surface 63 of transparent sheet 58 by printing directly thereon or by embedding it therein through various known techniques as illustrated in FIG. 10. An adhesive, preferably removeable double sided tape 69, is used to affix graphic cover plate 57 to top surface 42 of base plate 40, thereby completing information panel 12. Graphic cover plate 57 is aligned on base plate 40 by alignment means which keep it justified. Alignment means consists of a pair of spaced apart bores 70 and 72 formed through graphic cover plate 57 proximate side 47, a pair of corresponding bores 73 and 74 formed in base plate 40 proximate wear block 49 and a pair of temporary pins 75 and 77 receivable concurrently through bores 70 and 73 and bores 72 and 74 respectively.

After installing base plate 40, including the steps of removing rails 29 and 30, and conventional support plates 17(not shown), coupling base plates 40 to attachment members 22 as shown in FIG. 3 and replacing rails 29 and 30, graphic cover plate 57 is affixed to base plate 40 as illustrated in FIGS. 5-7. Referring specifically to FIG. 5, graphic cover plate 57 is aligned on top surface 42 of base plate 40, within recess 52 by aligning bores 70 and 73 and bores 72 and 74 respectively. Temporary pins 75 and 77 are then inserted concurrently through bores 70 and 73 and bores 72 and 74 respectively.

Side 68 of graphic cover plate 57 is bent upward, allowing access to double sided tape 69. Protective covering 78, covering half of double sided tape 69 is removed, as illustrated in FIG. 6, baring the adhesive which affixes half of graphics cover plate 57 to base plate 40. Temporary pins 75 and 77 are removed, no longer being required to retain graphic cover plate 57 in position, and side 67 is bent upwardly. Protective covering 79, covering the remaining half of double sided tape 69 is removed, as illustrated in FIG. 7, baring the adhesive which affixes the remaining half of graphics cover plate 57 to base plate 40. The use of a removeable double sided tape 69, allows graphic cover plate 57 to be easily exchanged without removing base plate 40, when different indicia 13 is desired.

FIG. 8 illustrates complete information panels 12 positioned so indicia 13 of each panel 12 combines with adjacent panels 12 to form a complete visual unit 14.

Figure 9:
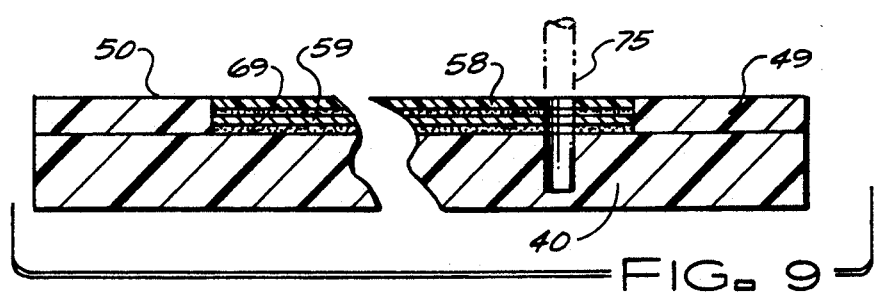
FIG. 9 is a cross-sectional side view of an information panel taken along line 9—9 of FIG. 8.

FIG. 9 shows a cross section of a completed information panel 12 illustrating how graphic cover plate 57 is received within recess 52 so that top surface 62 of transparent sheet 58, coincidentally the top surface of graphic cover plate 57, is flush with the top surface of wear blocks 49 and 50. The thickness of various layers have been exaggerated for purposes of illustration.

Turning now to FIGS. 11-16, an alternate embodiment of an information panel generally designated 80 is illustrated. Information panel 80 is generally rectangular, for use on sloped panel carousels, and consists of a base plate 82 and a graphic cover panel 83.

Referring specifically to FIG. 11, base plate 82 is illustrated. Base plate 82 is preferably made of a plastic laminate as described above, but may be constructed of other materials such as steel. As discussed above, in some circumstances the conventional plate may be used as base plate 82, with modifications made thereto as described below for base plate 82. Base plate 82 has a top surface 84, a bottom surface 85, a leading edge 87 a trailing edge 88, and opposing sides 89 and 90 extending between leading edge 87 and trailing edge 88. Base plate 82 is generally rectangular, and configured to replace conventional rectangular plates on sloped or flat conveyors. To achieve this end, base plate 82 is shaped similar to conventional rectangular support plates, preferably having a thickness of ¼ inch or 3/16 inch depending upon the conventional support plate used in the carousel.

A wear block 92 is affixed to top surface 84 extending around sides 89 and 90 and trailing edge 88. It protects base plate 82 from any rubbing by parts of the carousel as base plate 82 revolves on the carousel and also defines a recess 93. Wear block 92 is preferable formed from high density polyethylene, affixed to base plate 82 by way of high-bond double sided tape or other adhesive. Those skilled in the art will understand that while wear block 92 is preferably an independent element affixed to base plate 82, it may be formed integrally with base plate 82 and of the same material.

Base plate 82 is configured in a shape similar to the conventional plate it is replacing, and utilizes the carousels standard attachment members and attachment means. No modification need be made to the carousel receiving replacements of base plate 92. Attachment means, in this embodiment consists of bores 95 formed through wear block 92 and base plate 82 along trailing edge 88. One skilled in the art will understand that fasteners extend through bores 95 into a support bar of the carousel as is conventional in the art and not illustrated here. When installed on a carousel, leading edges 87 of base plates 82 overlap the portion of wear block 92 on trailing edges 88 of adjacent base plates 82. With additional reference to FIG. 13, it can be seen that a buffer strip 97 is affixed to bottom surface 85 along leading edge 87, which rides upon wear block 92 and protects graphic cover plate 83 from being scratched by leading edge 87 when moving around the corners of the carousel. Generally in carousels using rectangular panels, the panels overlap extensively when moving around the corners. Buffer 97 prevents leading edges 87 of adjacent panels 80, which overlap trailing edges 88 and extend past wear block 92 on the corners, from scratching graphic cover plate 83. Buffer strip 97 may be any material that is durable and will not scratch or wear information panel 80, such as the material used for the loop element of velcro fasteners.

Referring now to FIG. 12, graphic cover plate 83 is illustrated. Graphic cover plate 83 consists of a transparent sheet 98 and a thin layer 99 forming indicia. Transparent sheet 98 has a top surface 102, a bottom surface 103, a leading edge 104, a trailing edge 105, and opposing sides 107 and 108 extending between leading edge 104 and trailing edge 105. Transparent sheet 98 is configured to be received by recess 93, and is preferably formed from a general purpose commercial grade polycarbonate such as Lexan.

Thin layer 99 is preferably a laminate of photographic print medium, such as duraflex, affixed to bottom surface 103 of transparent plate 98 by a thin clear pressure sensitive photographic mounting film such as permatrans. It should be understood that thin layer 99 may be of various other materials and constructions such as a thin sheet of material which is printed upon, or a thin layer of ink affixed to the bottom surface 103 of transparent sheet 98 by printing directly thereon or by embedding it therein through various known techniques. An adhesive, preferably removeable double sided tape 109, is used to affix graphic cover plate 83 to top surface 84 of base plate 82, thereby completing information panel 80. Graphic cover plate 83 is aligned on base plate 82 by alignment means which keep it justified. Alignment means consists of a pair of spaced apart bores 110 and 112 formed through graphic cover plate 83 proximate side 107, a pair of corresponding bores 113 and 114 formed in base plate 82 proximate wear block 92 on side 89 and a pair of temporary pins 115 and 117 receivable concurrently through bores 110 and 113 and bores 112 and 114 respectively.

After installing base plate 82, in the conventional manner, graphic cover plate 83 is affixed to base plate 82 as illustrated in FIGS. 13-15. Referring specifically to FIG. 13, graphic cover plate 83 is aligned on top surface 84 of base plate 82, within recess 93 by aligning bores 110 and 113 and bores 112 and 114 respectively. Temporary pins 115 and 117 are then inserted concurrently through bores 110 and 113 and bores 112 and 114 respectively.

Side 108 of graphic cover plate 93 is bent upward, allowing access to double sided tape 109. Protective covering 118, covering half of double sided tape 109 is removed, as illustrated in FIG. 14, baring the adhesive which affixes half of graphics cover plate 83 to base plate 82 with side 108 and trailing edge 105 abutting wear block 92. Temporary pins 115 and 117 are removed, no longer being required to retain graphic cover plate 83 in position, and side 107 is bent upwardly. Protective covering 119, covering the remaining half of double sided tape 109 is removed, as illustrated in FIG. 15, baring the adhesive which affixes the remaining half of graphics cover plate 83 to base plate 82 with side 107 and trailing edge 105 abutting wear block 92. Top surface 102 of transparent sheet 98, coincidentally the top surface of graphic cover plate 83, is flush with the top surface of wear block 92. The use of a removeable double sided tape 109, allows graphic cover plate 83 to be easily exchanged without removing base plate 82, when different indicia is desired.

FIG. 16 illustrates complete information panels 80 positioned so the indicia of each panel 80 combines with adjacent panels 80 to form a complete visual unit.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An information panel for use in combination with an endless conveyor, said panel comprising:
   a base plate having a top surface;
   a recess defined by wear blocks extending from at least two edges of said base plate;
   a graphic cover panel affixed to said top surface within said recess; and
   alignment means for aligning said graphic cover panel on said base plate, said alignment means including:
     a bore extending through said graphic cover panel,
     a corresponding bore extending into said base plate, and
     a temporary pin receivable concurrently through said bores.

2. An information panel as claimed in claim 1 wherein said base plate further includes attachment means for attaching said base plate to an endless conveyor.

3. An information panel as claimed in claim 2 wherein said graphic cover panel includes:
   a transparent sheet configured to be received by said recess, and having a bottom surface;
   a thin layer containing indicia, affixed to said bottom surface of said transparent sheet; and
   affixing means for affixing said thin layer to said transparent sheet.

4. An information panel as claimed in claim 3 wherein said affixing means includes an adhesive.

5. An information panel as claimed in claim 4 wherein said thin layer containing indicia includes a photographic print medium.

6. An information panel as claimed in claim 4 wherein said thin layer containing indicia includes a thin sheet having indicia printed thereon.

7. An information panel as claimed in claim 3 wherein said thin layer includes a layer of ink.

8. An information panel as claimed in claim 7 wherein said affixing means includes embedding said ink into said transparent panel.

9. An information panel as claimed in claim 7 wherein said affixing means includes printing on said transparent panel.

10. A baggage carousel normally used for moving items, said carousel comprising:
    an attachment member;
    an information panel for supporting said items, said panel including;
      a base plate having a top surface,
      a recess defined by wear blocks extending from at least two edges of said base plate, said wear blocks prevent said base plate from rubbing against said baggage carousel, and
      a graphic cover plate affixed to said top surface within said recess, and
    attachment means for attaching said base plate to said attachment member.

11. An endless conveyor as claimed in claim 10 wherein said graphic cover plate includes:
    a transparent sheet configured to be received by said recess, and having a bottom surface;
    a thin layer containing indicia, affixed to said bottom surface of said transparent sheet; and
    affixing means for affixing said thin layer to said transparent sheet.

12. An information panel as claimed in claim 11 wherein said affixing means includes an adhesive.

13. An information panel as claimed in claim 12 wherein said thin layer containing indicia includes a photographic print medium.

14. An information panel as claimed in claim 12 wherein said thin layer containing indicia includes a thin sheet having indicia printed thereon.

15. An information panel as claimed in claim 11 wherein said thin layer includes a layer of ink.

16. An information panel as claimed in claim 15 wherein said affixing means includes embedding said ink into said transparent panel.

17. An information panel as claimed in claim 15 wherein said affixing means includes printing on said transparent panel.

18. An information panel as claimed in claim 11 further including alignment means for aligning said graphic cover plate on said base plate.

19. An information panel as claimed in claim 18 wherein said alignment means includes:
- a bore extending through said graphic cover plate;
- a corresponding bore extending into said base plate; and
- a temporary pin receivable concurrently through said bores.

20. A method of installing an information panel on a conveyor includes the steps of:
- providing a base plate having a top surface;
- providing wear blocks extending from at least two edges of said top surface of said base plate, defining a recess;
- attaching said base plate to said conveyor;
- providing a graphic cover plate having a back surface;
- placing said graphic cover plate on said top surface, within said recess; and
- inserting a temporary pin through a bore proximate a side in said graphic cover plate into a corresponding bore in said top surface proximate a side of said base panel, aligning said graphic cover plate on said base plate.

21. A method as claimed in claim 20 wherein said step of affixing further includes:
- bending back a side opposite said side having said temporary pin extending therethrough, away from said top surface;
- removing a protective cover from adhesive on said back surface;
- pressing said adhesive to said front surface;
- removing said temporary pin;
- bending back said side having said temporary pin extending therethrough, away from said top surface;
- removing a protective cover from adhesive on said back surface; and
- pressing said adhesive to said front surface.

22. A method as claimed in claim 21 further including the step of removing said graphic cover plate and affixing a second graphic cover plate.

* * * * *